United States Patent Office 3,054,777
Patented Sept. 18, 1962

3,054,777
LINEAR POLYUREAS
Yanosuke Inaba, Fujisawa City, Kunihiko Miyake, Kamakura City, and Goro Kimura, Fujisawa City, Japan, assignors to Toyo Koatsu Industries, Incorporated, Tokyo, Japan, a corporation of Japan
No Drawing. Filed May 12, 1959, Ser. No. 812,585
Claims priority, application Japan May 16, 1958
12 Claims. (Cl. 260—77.5)

It has been known from the art (see British Patent No. 530,267) that polyureas are formed by reacting urea or urea derivatives with alkylene-diamines under heating, in the absence of solvents or in the presence of solvents of the phenolic type. In this process, it is difficult to obtain pure linear polyureas, because of the formation of biuret or biuret-like impurities, which are formed as by-products, as stated in said British patent.

A principal object of the invention is to provide an improved method for preparing linear polyureas excellent in physical and chemical properties.

Further object of the invention is to provide an improved method for preparing polyureas wherein polycondensation reaction is easily controlled and whereby neither bridging nor braching formation of the polymers takes place.

This invention is based on the discovery that the reaction between urea or urea derivatives and diamines pertaining to hetero-membered saturated aliphatic chain compounds, whose alkylene radicals are connected with more than one of the ether radical (—O—) or sulfide radical (—S—), i.e. a fatty alkylene diamine corresponding to one of the general formulae $$H_2N-R_1-O-R_2-NH_2$$
$$H_2N-R_1-O-R_3-O-R_2-NH_2$$
$$H_2N-R_1-S-R_2-NH_2$$
$$H_2N-R_1-S-S-R_2-NH_2$$
$$H_2N-R_1-S-R_3-S-R_2-NH_2$$

in which $R_1$, $R_2$ or $R_3$ indicates alkylene radicals having 2–8 carbon atoms, gives valuable linear polyureas.

In studies carried out by the inventors it has been found that the above reaction between alkylene diamine of either the ether or the sulfide type, and urea, or urea derivatives yields in its initial stage isocyanic acid or an isocyanate radical due to dissociation of the urea or urea radicals, whereupon addition polymerization takes place between isocyanic acid or isocyanate and the amino radical. As the reaction proceeds, amine exchange reaction begins to occur whereby a complete linear polymer is formed. The addition polymerization between this isocyanate radical and the amino radical of diamine containing more than one of ether radical or a sulfide radical, takes place at considerably low temperatures ranging from 80 to 130° C., and it forms ω,ω′-aminoureidodialkylether (in case of diamine of monoether type); ω,ω′-aminoureidodialkylsulfide (in case of diamine of monosulfide type); ω,ω′-aminoureidotrialkyldiether (in case of diamine of diether type); or ω,ω′-aminoureidotrialkyldisulfide (in case of diamine of disulfide type). These reaction products have far lower melting points than those made by the addition polymerization of 1 molecule diamine with one alkylene radical exclusively, and 1 molecule urea, namely ω,ω′-aminoureidoalkyl with the same number of carbon atoms, and their condensation reaction proceeds smoothly even at low temperatures.

However, in heating the above mentioned diamines and urea together at high temperatures, dialkylene etherdiurea or trialkylenedietherdiurea and dialkylenesulfide diurea or trialkylenedisulfide diurea are likely to be formed, and consequently polymers obtained from these compounds contain branches or bridges in their molecules by a reaction similar to the biuret reaction. This is not favorable for the production of linear polymers. Therefore, to obtain a linear polymer with good spinning characteristics as starting material, it is desirable first of all to use ω,ω′-aminoureidodialkylether, ω,ω′-aminoureidodialkylsulfide, ω,ω′-aminoureidotrialkyldiether, or ω,ω′-aminoureidotrialkyldisulfide by addition polymerization between one molecule of diamine containing more than one ether or sulfide radicals, and one molecule of urea. To realize this, it is necessary that the diamine and urea should be reacted under heating at comparatively low temperatures. In this connection it has been found that in heating both urea or a urea derivative with a diamine containing more than one ether or sulfide radical without solvents, or with water, or solvents of the phenolic type, in the presence of an inert gas at comparatively low temperature ranging from 80 to 130° C., ammonia evolves in an amount corresponding to about half of the theoretical amount; that in using diamine of a monoether type as a raw material, a reaction product is formed which comprises 1 to 2% alkyleneether diurea and unreacted urea and over 98% ω,ω′-aminodiureidoalkylsulfide; in using diamine of a diether or disulfide type as a raw material, a reaction product is formed which comprises over 98% ω,ω′-aminoureidotrialkyldiether or ω,ω′-aminoureidotrialkyldisulfide.

Linear polyurea of high purity is formed by reaction under heating of the above reaction products, in the presence of an inert gas, which have been either separated from the reaction system or not, at an elevated temperature which finally reaches 210°–280° C. In the course of heating, deammoniation takes place in liquid state violently evolving ammonia between 140° to 190° C. The poly-condensation process proceeds quite smoothly, whereby pure linear polyureas are formed substantially without branches or bridges as will be explained in more detail further below.

To complete the poly-condensation reaction after the reaction products have been heated to 210 to 280° C., further heating is applied under pressure which is gradually reduced. The pressure can easily be lowered to vacuum without violent foaming. Thereby the reaction products turn to a colorless transparent melt which foams at a rate of once in every five minutes commencing 30 minutes after the vacuum heating began. The product can be melted again homogeneously without foaming even after it has been solidified by cooling, and it can be processed not only by spinning, but also by plastic molding.

The fact that the reaction products can be easily treated under vacuum without violent foaming, shows that in said products neither unreacted low condensates, nor unreacted urea radicals nor by-products are present. By way of comparison, poly-condensation with straight-chain alkylenediamine containing no ether radical and containing over 6 methylene radicals was carried out by the same operational procedures as described above, but in this case the reaction product formed solidified with violent deammoniation at 160° to 180° C., and had to be remelted homogeneously under heating. Such solidification tends to cause partial superheating of the reaction products, which results in the formation of by-products with branching or bridging. Moreover, the re-melting treatment takes a long time and is often followed by trouble in the apparatus and its operation.

The novel and improved result of this invention is the synthesis of new linear poly-ureas from diamines, each of which contains more than one ether or sulfide radical with a view of improving the above defects, as well as increasing the rate of absorption for many kinds of dyestuffs and resistance to alkali and sunlight.

According to this invention, urea or urea derivatives and alkylenediamine containing more than one ether or sulfide radical, are heated at considerably low temperatures ranging from 80 to 130° C. without a solvent or in the presence of water or a solvent of the phenolic type in the presence of an inert gas, in order to form a high yield of ω,ω'-aminodiureidoalkylether (in the case of diamine of monoether type used as a raw material of diamine); ω,ω'-aminodiureidoalkylsulfide (in the case of diamine of monosulfide type); ω,ω'-aminoureidotrialkyldiether (in the case of diamine of diether type), or ω,ω'-aminoureidotrialkyldisulfide (in the case of diamine of disulfide type). The reaction product obtained, or the reaction product after separation, is subjected to further reaction under heating at high temperature to complete the deammoniation (where, the aqueous or phenolic solvent must be distilled off, if used), and thereafter the reaction is still further continued under heating at a reduced pressure, whereby it is converted to a purely linear polyurea on the conclusion of the polymerization pertaining to high molecular weight.

This polymer is a new linear polyurea with not only more prominent spinning characteristics, high strength, good curling properties, and reasonable amount of residual elongation, but also of increased alkali and light resistances, as well as higher capacity of being dyed than those polyureas which are obtained from alkylenediamine which contains neither ether nor sulfide radical. In preparing polyureas of high quality, it is desirable to use many kinds of alkylmonoamines, alkylmonoamides or saturated monobasic acid as molecular-weight stabilizers or viscosity stabilizers.

Example 1

192 parts of 5.5'-diamino-diamyl ether, 60 parts of urea and 5.1 parts of palmitic acid (corresponding to a molecular ratio of 102:100:2) are introduced into a reactor provided with a gas outlet, and heated in a pure nitrogen gas atmosphere, in the absence of air, at about 100° C. for 15 hours. Thereby the urea melts with the evolution of ammonia and the amount of ammonia evolved corresponds to about 50% of the theoretical amount. The reaction product contains a yield of over 98% of 5.5'-amino-ureido-diamylether and 1–2% of 5.5'-diaminobis-(diamylether) urea, 5.5'-diureidodiamylether and unreacted residual urea. Upon gradually raising the temperature the reaction proceeds smoothly with the violent evolution of ammonia at 150°–160° C. The reaction mass is then heated until the temperature reaches 240° C., in the presence of highly pure nitrogen. It is then further reacted under heating to 240° C. at a reduced pressure of 1 mm. Hg for about 5 hours. Thereby a polymerization product in the form of an almost colorless transparent melt is obtained. This melt has excellent spinning characteristics and is easily spinnable to long filaments. It has a strength as high as 5–6 g./d. and good curling properties. It has high affinity to many dyestuffs and good resistance to alkali and sunlight.

The polymer thus obtained can be remelted after solidification without foaming and can be subjected to molding. It has a melting point of 200° to 205° C.

Example 2

192 parts of 5.5'-diaminodiamyl ether, 60 parts of urea, 2.6 parts of palmitic acid amide (corresponding to a molecular ratio of 102:100:1) are dissolved in 50 parts of water and the solution is introduced into a reflux reactor filled with nitrogen gas of high purity in order to prevent contact with air. This reactor is kept for 20 hours at 85°–95° C. whereby with the evolution of ammonia a reaction takes place and 5.5'-aminoureidodiamylether is formed with a yield of over 98%. This reaction product is heated to 120°–130° C., whereby the water present is distilled off. The reaction product is then further heated in the presence of nitrogen of high purity until the temperature reaches about 230° C. and reacted under heating at this temperature at a reduced pressure of 1.5 mm. of Hg for about 3 hours. The resulting product has an intrinsic viscosity of 0.70 in m-cresol, a strength of 5.5–6.5 g./d. and can be dyed with many kinds of dyestuffs. The product can be spun to long filaments by conventional methods and has a high resistance to alkali and sunlight.

Example 3

135 parts of 3.3'-diaminodipropyl ether, 60 parts of urea and 2.6 parts of octylamine (corresponding to a molecular ratio of 102:100:2) are dissolved in 50 parts of water and the solution is introduced into a reactor which is provided with a gas outlet and is filled with nitrogen gas of high purity in order to prevent contact with air. In the reactor the solution is heated for 14 hours at 95° C., whereby a reaction product having an average molecular weight of 177 is formed. The yield of the ω,ω'-aminoureido propylether amounts then to over 97%. The product is further heated to 120° C. whereby the water content is distilled off, while in still further heating the viscosity of the reaction product gradually increases and ammonia is evolved. Evolution of ammonia takes place violently at 160° to 170° C., although the polycondensation reaction proceeds smoothly with the formation of a viscous liquid. The reaction mass is further heated in the presence of nitrogen of high purity until the temperature reaches 250° C. and is then further reacted under heating to about 250° C. under a reduced pressure of 1.5 mm. Hg for 4 hours, whereby an almost colorless transparent melt of the polymer is formed. This polymer has favorable spinning characteristics and is easily spinnable to long filaments.

The strength of such filaments is 5–6 g./d. The filaments have a high absorption rate for many dyestuffs and a high resistance to alkali and sunlight. After solidifying the melt of the polymer by cooling to room temperature, it can be melted again without foaming. It can be easily spun in chips and can be molded according to methods which are conventional in the art of plastics. This linear polyurea has a melting point of 235° to 245° C.

Example 4

163 parts of 4.4'-diaminodibutyl ether, 132 parts of methylenediurea, and 1.6 parts of pelargonic acid (corresponding to a molecular ratio of 102:100:1) are dissolved in 50 parts of phenol and the solution is introduced into a reactor which is provided with a gas outlet and filled with nitrogen gas of high purity in order to prevent contact of the solution with air. The solution is then heated in the reactor at about 100° C. for about 12 hours, whereby the reaction proceeds with the evolution of ammonia in an amount equivalent to 50% of the theoretical amount. The rate of unreacted urea remaining in the reaction product is only about 0.5% and the molecular weight of the reaction product, calculated at the extreme terminal of the amino radical, reaches 177. The yield of ω,ω'-aminoureidomethylene-urea dibutyl ether forced exceeds 98%. Upon further heating, the reaction product reacts violently at 160°–170° C. with the evolution of ammonia. After distilling off the phenol at 210° C., the reaction product is further heated in the presence of nitrogen of high purity until the temperature reaches about 245° C. and is then reacted under heating to about 245° C. at a reduced pressure of 1–2 mm. of Hg for 4 hours. Thereby an almost colorless transparent melt is obtained, the characteristics of which are similar to those of the product obtained in the above Example 1, except for its melting point which is 225°–230° C.

Example 5

272 parts of carbonate of ethyleneglycolbis (3-aminopropylether), 60 parts of urea, 5.2 parts of palmitic acid amide (corresponding to a molecular ratio of 103:100:2) are dissolved in 100 parts of water and the solution is reacted in a shaking autoclave at 110° C. for 7 hours. During the heating period the reaction product is subjected to filtration. The reaction product present in the filtered solution contains over 97% ethyleneglycol-3.3'-aminoureidobis (propylether). After distilling off the major portion of water under heating at 120–125° C., the reaction product is further heated, whereby its viscosity increases without solidification and with the evolution of ammonia. It is then further heated up to 240° C., in the presence of pure nitrogen, and reacted under heating to 240° C. at a reduced pressure of 1–2 mm. Hg for 5 hours, whereby a polymerization product of linear polyurea with a melting point of 225° to 230° C. is obtained. It is easily spinnable and has a strength of 5 to 6 g./d. at an elongation to about 4 to 5 times. It has good curling properties, favorable absorption rate to dyestuffs and alkali and sunlight resistance.

Example 6

176 parts of 4.5'-diaminobutylamylether, 60 parts of urea and 5.1 parts of palmitic acid (i.e. a molecular ratio of 101:100:2) is introduced into a reactor provided with a gas outlet and filled with hydrogen gas in order to prevent contact of the reaction system with air.

The reaction system is now heated at 100° C. for 8 hours whereby the urea is melted with the evolution of ammonia. The ammonia evolution correspond to 50% of the theoretical amount. The reaction product comprises over 98% of ω,ω'-aminoureidobutylamylether. Upon raising the temperature gradually, the product becomes a viscous liquid, which violently evolves ammonia at 150 to 160° C. without solidification, whereby the polymerization reaction proceeds smoothly.

The reaction product is further heated till the temperature reaches 250° C. in the presence of hydrogen and reacted under heating to 250° C. at a reduced pressure of 1 mm. Hg for 2 hours, whereby an almost colorless transparent melt is obtained. This polymer has very favorable spinning characteristics and is easily spinnable to long filaments. It can be dyed by dyestuffs, has a strong resistance to laundering and sunlight resistance, after it has been dyed.

Example 7

222 parts of propylenglycolbis (4-aminobutylether), 60 parts of urea, 5.2 parts of palmitic acid amide (i.e. a molecular ratio 102:100:2) is introduced into a reactor provided with a gas outlet, heated there at 95° C. for 10 hours. The reactor is filled with nitrogen gas of high purity in order to prevent the reaction system from contact with air. The reaction takes place with the evolution of ammonia to form a reaction product, the yield in ω,ω'-aminoureidopropyleneglycolbis (4-butyl) ether of which reaches about 98%. The reaction product is further heated till the temperature reaches 250° C. in the presence of highly pure nitrogen and reacted under heating to 250° C. at a reduced pressure of 1.5 mm. Hg for 4 hours, whereby the product becomes an almost colorless transparent melt. This polymer has favorable spinning characteristics, is easily spinnable to long filaments and has a strength of 5 to 6 g./d. It can be dyed with many dyestuffs and has alkali and sunlight resistance. This polymer can be re-melted from the solid state without foaming, and it can be molded.

Example 8

208 parts of 5.5'-diaminodiamylsulfide, 60 parts of urea and 2.6 parts of palmitic acid amide (i.e. in a molecular ratio of 102:100:1) are introduced into a reactor provided with a gas outlet and filled with high pure nitrogen in order to prevent the reaction system from contact with air. The solution is heated in the reactor at 100° C. for 13 hours, whereby it forms a reaction product with an average molecular weight of 249, in which the yield of ω,ω'-aminoureidodiamylsulfide amounts to about 98%. Upon raising the temperature, the viscosity of the reaction system increases with violent evolution of ammonia at 160 to 170° C., but without being solidified, whereby the poly-condensation reaction proceeds smoothly. The reaction product is further heated till the temperature reaches 240° C. in the presence of highly pure nitrogen and reacted under heating to 240° C. at a reduced pressure of 1 mm. Hg for 5 hours. Thereby an almost colorless transparent melt is obtained. It has favorable spinning characteristics and is easily spinnable to long filaments with a strength of 5.5 to 6.5 g./d. It also has good curling properties. It can be dyed with many dyestuffs and its resistance to laundering, after it is dyed, is good. It has good alkali and sunlight resistances. The melting point of the product is 225° to 230° C.

Example 9

180 parts of 4.4'-diaminodibutylsulfide, 132 parts of methylenediurea, 5.1 parts of palmitic acid (i.e. a molecular ratio of 102:100:2) are dissolved in 100 parts of phenol and the solution is introduced into a reactor provided with a gas outlet and filled with nitrogen gas of high purity in order to prevent the reaction system from contact with air. The reaction mixture is heated at 100° C. for 10 hours, whereby it reacts with the evolution of ammonia in an amount corresponding to 50% of the theoretical amount. The rate of the unreacted urea remaining in the reaction product is about 0.6%, and the yield of ω,ω'-aminoureidomethyleneurea dibutylsulfide amounts to over 98%. In heating it without treatment, the reaction product reacts at 160° to 170° C. with violent evolution of ammonia. After distilling off the phenol content at 210° C. to 215° C., it is further heated till the temperature reaches 250° C. in the presence of pure nitrogen and reacted under heating to 250° C., at a reduced pressure of 1.5 mm. Hg for 5 hours, whereby an almost colorless transparent melt is obtained. This has the same characteristics as the product of Example 8 except for the melting point of 235° to 245° C.

The parts and percent mentioned above are by weight if not otherwise stated. The abbreviation "g./d." stands for "gram/denier."

What is claimed is:

1. An improved method for preparing linear polyureas comprising a first step wherein a urea compound selected from the class consisting of urea and methylene diurea and a diamine selected from the class consisting of diamines represented by the formulae $$H_2N-R_1-O-R_2-NH_2$$

$$H_2N-R_1-O-R_3-O-R_2-NH_2$$

$$H_2N-R_1-S-R_2-NH_2$$

$$H_2N-R_1-S-S-R_2-NH_2$$

$$H_2N-R_1-S-R_3-S-R_1-NH_2$$

wherein each $R_1$, $R_2$ and $R_3$ stands for alkylene radical having 2–6 carbon atoms in a stoichiometrical ratio of diamine to urea compound of at least 1 are caused to react at a temperature between 80° C. and 130° C. for a period of time sufficient to form an addition compound of the urea and the diamine; a second step wherein said intermediate compound is heated above 130° C. for a period of time sufficient to complete substantially polycondensation reaction.

2. The improved method as claimed in claim 1 wherein said ratio is 1.01 to 1.03.

3. The improved method as claimed in claim 1 wherein the addition compound is subjected to heating with a gradual elevation starting from 130° C. up to a temperature ranging from 210° C. to 280° C.

4. The improved method as claimed in claim 1 wherein the addition compound is subjected to heating under vacuum thereby completing the polycondensation reaction.

5. The improved method as claimed in claim 1 wherein the starting materials are urea and an at least equimolecular amount of 5,5'-diamino-diamyl ether.

6. The improved method as claimed in claim 1 wherein the starting materials are urea and an at least equimolecular amount of 3,3'-diamino-dipropyl ether.

7. The improved method as claimed in claim 1 wherein the starting materials are urea and an at least equimolecular amount of 4,4'-diaminobutyl ether.

8. The improved method as claimed in claim 1 wherein the starting materials are urea and an at least equimolecular amount of ethyleneglycolbis (3-aminopropyl ether).

9. The improved method as claimed in claim 1 wherein the starting materials are urea and an at least equimolecular amount of 4,5'-diamino-butyl-amyl ether.

10. The improved method as claimed in claim 1 wherein the starting materials are urea and an at least equimolecular amount of propyleneglycolbis (4-aminobutyl ether).

11. The improved method as claimed in claim 1 wherein the starting materials are urea and an at least equimolecular amount of 5,5'-diamino-diamyl sulfide.

12. The improved method as claimed in claim 1 wherein the starting materials are methylenediurea and an at least equimolecular amount of 4,4'-diamino-dibutyl-sulfide.

References Cited in the file of this patent

UNITED STATES PATENTS

| | | |
|---|---|---|
| 2,874,149 | Applegath et al. | Feb. 17, 1959 |
| 2,973,342 | Inaba et al. | Feb. 28, 1961 |

FOREIGN PATENTS

| | | |
|---|---|---|
| 530,267 | Great Britain | Dec. 9, 1940 |
| 534,699 | Great Britain | Mar. 14, 1941 |